US008723989B2

(12) United States Patent
Takahashi et al.

(10) Patent No.: US 8,723,989 B2
(45) Date of Patent: May 13, 2014

(54) IMAGE DISTORTION PROCESSING APPARATUS, AND METHOD OF OPERATING AN IMAGE DISTORTION PROCESSING APPARATUS

(75) Inventors: Kazuma Takahashi, Osaka (JP); Gen Sasaki, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 594 days.

(21) Appl. No.: 12/949,181

(22) Filed: Nov. 18, 2010

(65) Prior Publication Data

US 2011/0122298 A1 May 26, 2011

(30) Foreign Application Priority Data

Nov. 26, 2009 (JP) ................................. 2009-268284

(51) Int. Cl.
*H04N 5/262* (2006.01)
(52) U.S. Cl.
USPC ........................................................ 348/241
(58) Field of Classification Search
USPC ........................................................ 348/241
See application file for complete search history.

(56) References Cited

U.S. PATENT DOCUMENTS

| 8,228,396 B2 * | 7/2012 | Hagiwara | 348/222.1 |
| 2005/0053307 A1 * | 3/2005 | Nose et al. | 382/275 |
| 2006/0188172 A1 * | 8/2006 | Higurashi et al. | 382/275 |
| 2007/0013926 A1 * | 1/2007 | Miyata | 358/1.9 |
| 2008/0232717 A1 | 9/2008 | Nishimura et al. | |
| 2009/0002523 A1 * | 1/2009 | Maekawa | 348/231.2 |
| 2009/0059040 A1 * | 3/2009 | Kamon | 348/241 |
| 2010/0246994 A1 * | 9/2010 | Sawada | 382/275 |
| 2012/0093410 A1 | 4/2012 | Sasaki et al. | |

FOREIGN PATENT DOCUMENTS

| JP | 59-085184 | 5/1984 |
| JP | 2003-108989 | 4/2003 |
| JP | 2005-044098 | 2/2005 |
| JP | 2005045514 A * | 2/2005 |
| JP | 2007-267379 | 10/2007 |

(Continued)

OTHER PUBLICATIONS

Office Action mailed Jan. 21, 2014 in Japanese Patent Application No. 2009-268284 filed Nov. 26, 2009 (With Computer generated English translation).

*Primary Examiner* — Gary C Vieaux
(74) *Attorney, Agent, or Firm* — Oblon, Spivak, McClelland, Maier & Neustadt, L.L.P.

(57) ABSTRACT

An image processing apparatus includes: a relative coordinate acquisition part acquiring a corresponding position on an input image with respect to a predetermined pixel on an output image; a first storage part storing position information of the corresponding position; a reading control part causing pixel values of input pixels on the input image to be sequentially read; an organization part organizing a set of grid points formed of input pixels among input pixels read by the reading control part; a judgment part judging, based on the position information, whether or not pixel values of pixels in the vicinity of the corresponding position used in calculating a pixel value of the predetermined pixel have been read; a local memory storing, in a case where judgment is made that pixels in the vicinity of the corresponding position have been read, pixel values of pixels forming the set of grid points as pixel values of surrounding pixels regarding the predetermined pixel; and a pixel value calculation part calculating a pixel value of the predetermined pixel by interpolation using the pixel values of the surrounding pixels.

8 Claims, 21 Drawing Sheets

(56) References Cited

FOREIGN PATENT DOCUMENTS

| JP | 2008-118306 | 5/2008 |
| JP | 2008-234478 | 10/2008 |
| JP | 2009-10730 | 1/2009 |
| WO | WO 2008/139577 A1 | 11/2008 |

* cited by examiner

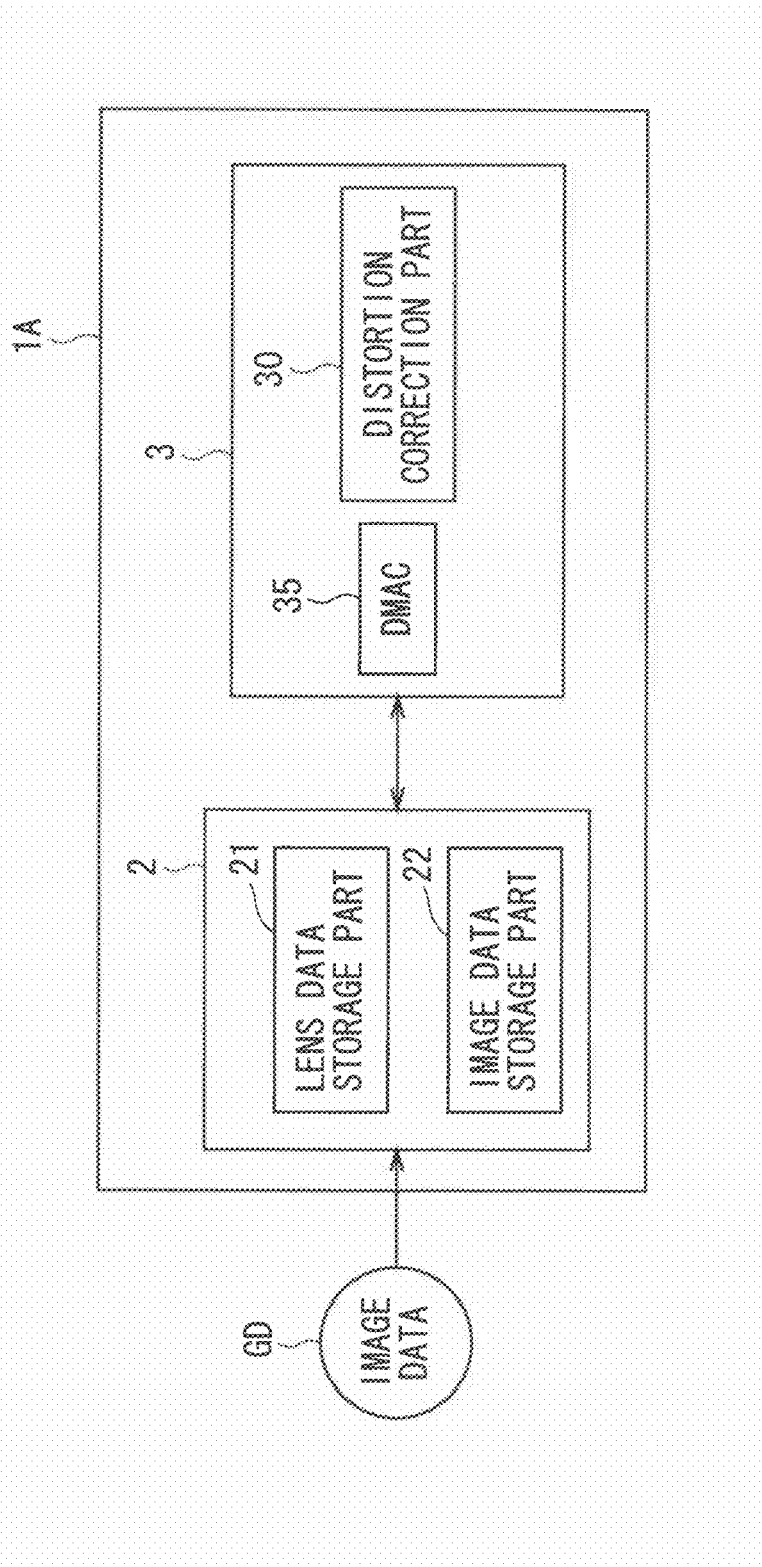

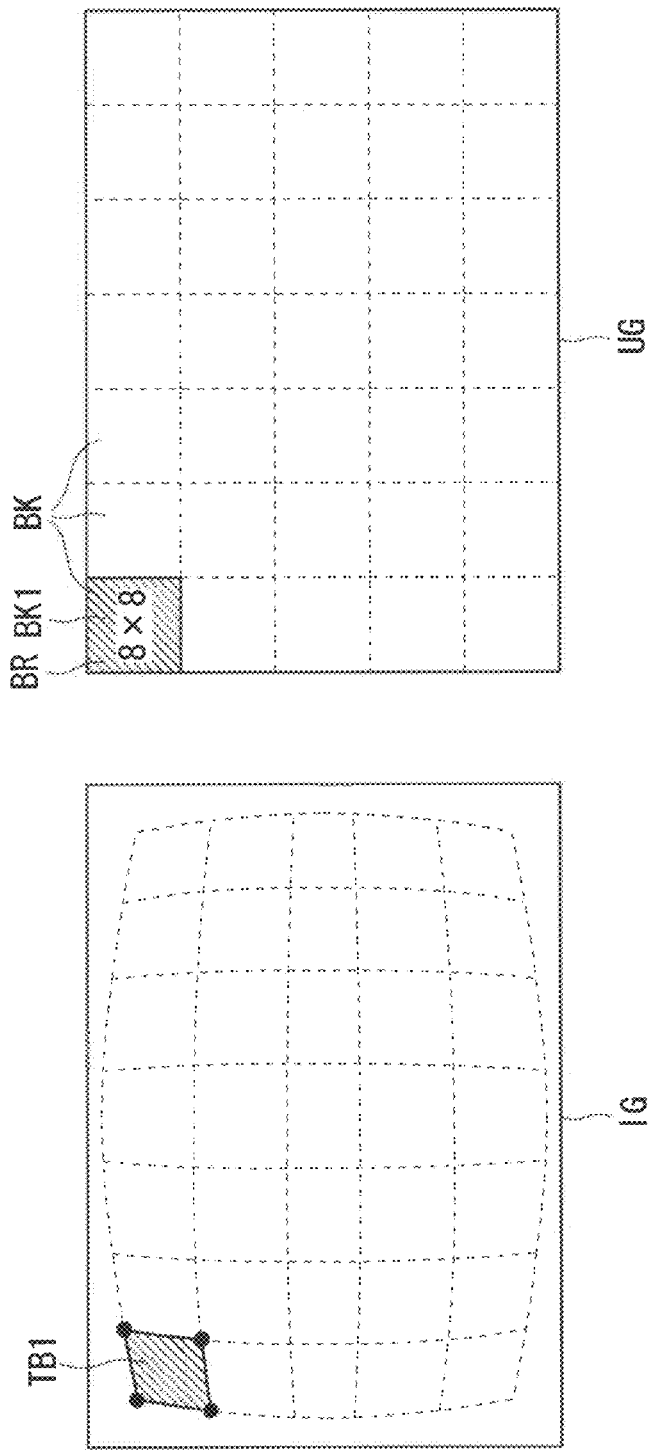

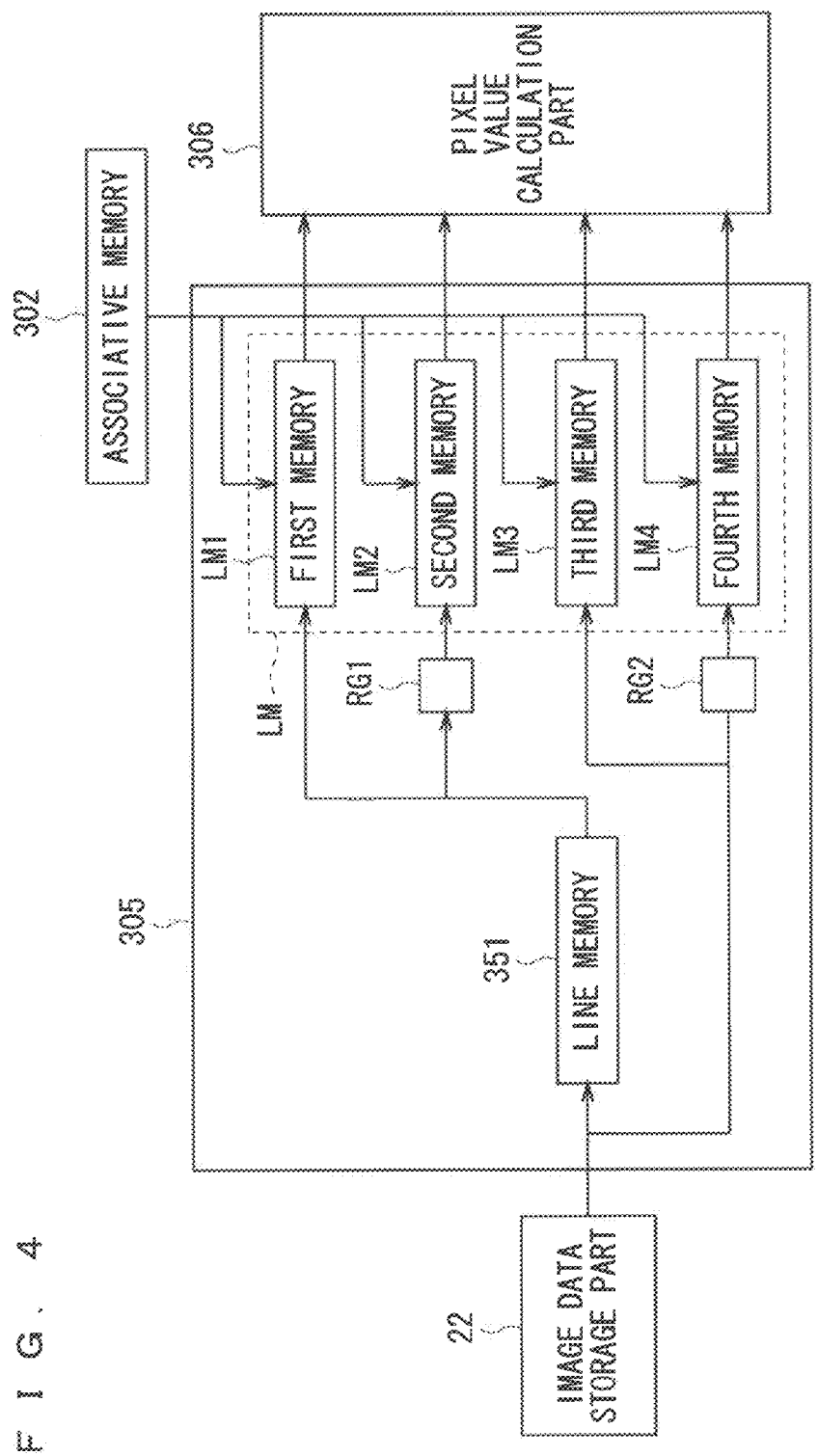

F I G. 5

| PROCESSING STEP | DETAILS OF PROCESSING | RELATED CONFIGURATION |
|---|---|---|
| RELATIVE COORDINATE ACQUIRING STEP ST1 | CORRESPONDING POSITION SPECIFICATION PROCESSING | RELATIVE COORDINATE ACQUISITION PART |
| | OFFSET PROCESSING | |
| | REFERENCE AREA SETTING PROCESSING | |
| | RELATIVE COORDINATE CALCULATION PROCESSING | |
| | RELATIVE COORDINATE STORAGE PROCESSING | ASSOCIATIVE MEMORY |
| PIXEL VALUE READING PROCESSING ST2 | PIXEL VALUE READING PROCESSING | READING CONTROL PART PIXEL VALUE STORAGE PART |
| | COORDINATE SEARCH PROCESSING | READING POSITION COUNTER ASSOCIATIVE MEMORY |
| | SPECIFIC PIXEL VALUE STORAGE PROCESSING | PIXEL VALUE STORAGE PART |
| OUTPUT PIXEL VALUE CALCULATING STEP ST3 | RELATIVE COORDINATE ACQUISITION PROCESSING | RELATIVE COORDINATE ACQUISITION PART |
| | PIXEL VALUE CALCULATION PROCESSING | PIXEL VALUE CALCULATION PART |

F I G. 9
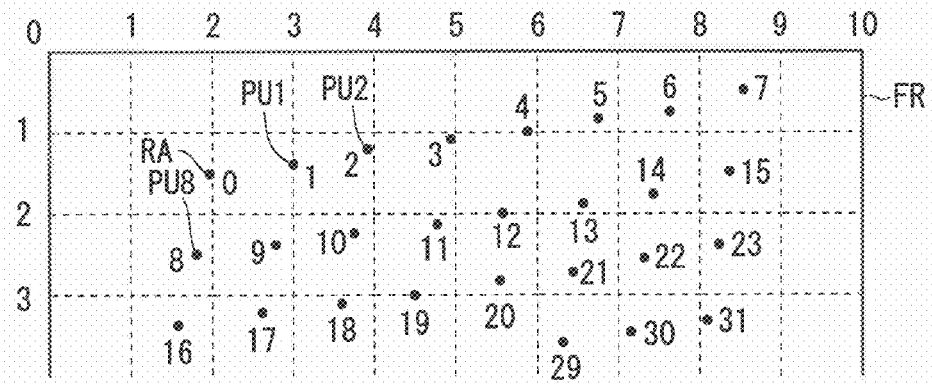
| ADDRESS | POSITION INFORMATION OF CORRESPONDING RELATIVE POSITION | |
|---|---|---|
| | x COORDINATE | y COORDINATE |
| 0 | 2 | 1 |
| 1 | 3 | 1 |
| 2 | 3 | 1 |
| 3 | 4 | 1 |
| 4 | 5 | 1 |
| 5 | 6 | 0 |
| 6 | 7 | 0 |
| 7 | 8 | 0 |
| 8 | 1 | 2 |
| ... | ... | ... |
| 63 | 7 | 7 |

| ADDRESS | POSITION INFORMATION OF CORRESPONDING RELATIVE POSITION | |
|---|---|---|
| | x COORDINATE | y COORDINATE |
| 0 | 2 | 1 |
| 1 | 3 | 1 |
| 2 | 3 | 1 |
| 3 | 4 | 1 |
| 4 | 5 | 1 |
| 5 | 6 | 0 |
| 6 | 7 | 0 |
| 7 | 8 | 0 |
| 8 | 1 | 2 |
| ... | ... | ... |
| 63 | 7 | 7 |

302

F I G. 1 3

| ADDRESS | INPUT PIXEL VALUE |
|---|---|
| 0 | |
| 1 | |
| 2 | |
| 3 | |
| 4 | |
| 5 | PV(6,0), PV(7,0), PV(6,1), PV(7,1) |
| 6 | |
| 7 | |
| 8 | |
| ... | |
| 63 | |

LM

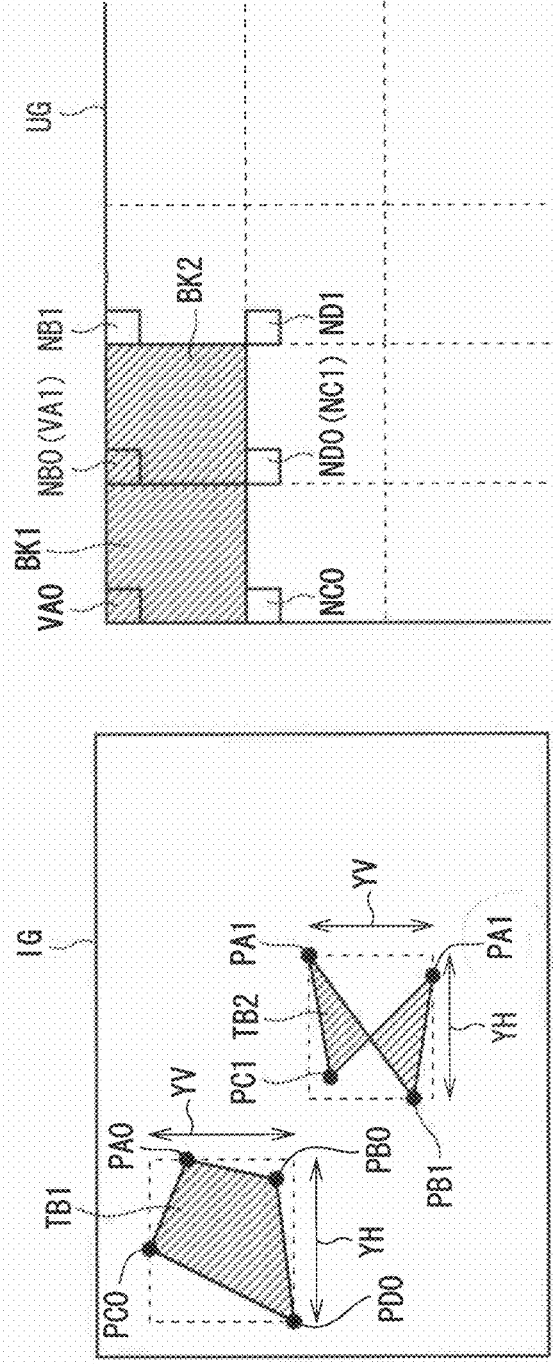

F I G. 2 3
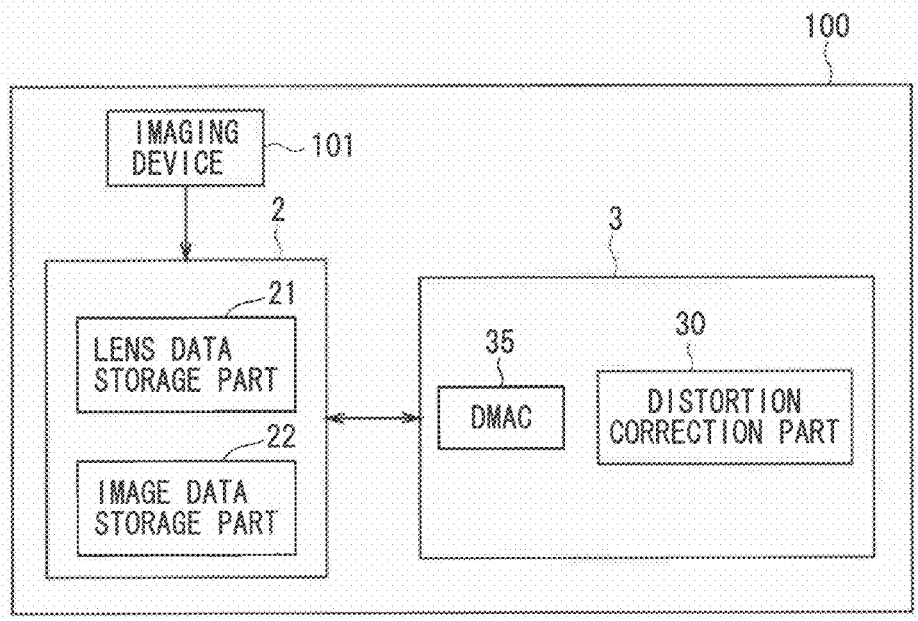

IMAGE DISTORTION PROCESSING APPARATUS, AND METHOD OF OPERATING AN IMAGE DISTORTION PROCESSING APPARATUS

BACKGROUND OF THE INVENTION

1. Field of the Invention

The present invention relates to an image processing technology.

2. Description of the Background Art

Typically, imaging lenses used in imaging apparatuses or the like have various aberrations such as spherical aberrations and distortions. Therefore, in creating imaging lenses, they are designed to have reduced these aberrations.

However, it is difficult to remove these aberrations only by lens design, and thus the technology is proposed in which a distortion of an image resulting from an aberration of a lens is corrected by image processing on data in a case where a subject image can be obtained as image data by an imaging device.

For example, Japanese Patent Application Laid-Open No. 2009-10730 describes the technology in which an output image is obtained by performing distortion correction processing on an image captured through an imaging lens. Specifically, in the technology of Japanese Patent Application Laid-Open No. 2009-10730, a corresponding position of a predetermined pixel of an output image on a captured image is obtained using a look-up table, and a pixel value of a pixel at the corresponding position on the captured image is used as a pixel value of the predetermined pixel of the output image. Further, as to pixels other than the predetermined pixel that are not present in the look-up table, corresponding positions thereof are obtained by a first interpolation process and pixel values regarding the pixels other than the predetermined pixel are obtained by a second interpolation process that is based on the obtained corresponding position.

In the technology described in Japanese Patent Application Laid-Open No. 2009-10730, however, image data of a captured image is transferred from a storage part storing the captured image through, for example, a bus when pixel values of pixels on an output image are calculated. As a result, the use efficiency of the bus is reduced if random access is frequently made by transfer of the image data.

Malfunctions due to excessive transfer of image data as described above are not limited to the case of using a bus and may also occur in a case where other transfer means other than a bus is used.

SUMMARY OF THE INVENTION

An object of the present invention is therefore to provide the technology capable of reducing malfunctions caused by transfer of image data.

To achieve the above-mentioned object, an image processing apparatus according to a first aspect of the present invention includes: an acquisition part acquiring a corresponding position on an input image with respect to a predetermined pixel on an output image; a first storage part storing position information of the corresponding position; a reading controller causing pixel values of input pixels on the input image to be sequentially read; an organization part organizing a set of grid points formed of input pixels among input pixels read by the reading controller; a judgment part judging, based on the position information, whether or not pixel values of pixels in the vicinity of the corresponding position used for calculation of a pixel value of the predetermined pixel have been read; a second storage part storing, in a case where judgment is made that pixels in the vicinity of the corresponding position have been read by the judgment part, pixel values of pixels forming the set of grid points as pixel values of surrounding pixels regarding the predetermined pixel; and a calculation part calculating a pixel value of the predetermined pixel by interpolation using the pixel values of the surrounding pixels stored in the second storage part.

Accordingly, it is possible to reduce malfunctions caused by transfer of image data.

Further, according to a second aspect of the present invention, in the image processing apparatus according to the first aspect, the reading controller causes the pixel values of the input pixels to be read in a raster sequence.

Further, according to a third aspect of the present invention, in the image processing apparatus according to the first or second aspect, the second storage part stores the pixel values of surrounding pixels regarding a plurality of the predetermined pixel in a raster sequence on the output image; and the calculation part sequentially calculates the pixel values of predetermined pixels using the pixel values of the surrounding pixels input in units of the predetermined pixels based on a storage sequence in the second storage part, and sequentially outputs the calculated pixel values of the predetermined pixels.

Further, according to a fourth aspect of the present invention, in the image processing apparatus according to any one of the first to third aspects, the first storage part and the judgment part are implemented by an associative memory.

Further, according to a fifth aspect of the present invention, in the image processing apparatus according to any one of the first to fourth aspects, the acquisition part acquires the corresponding position regarding the predetermined pixel included in a block obtained by dividing the output image, and sets a reference area including a corresponding block on the input image with respect to the block; and the reading controller causes the pixel values of the input pixels included in the reference area to be sequentially read.

Further, a method of operating an image processing apparatus according to the present invention includes the steps of: a) acquiring a corresponding position on an input image with respect to a predetermined pixel on an output image; b) storing position information of the corresponding position; c) causing pixel values of input pixels on the input image to be sequentially read; d) organizing a set of grid points formed of input pixels among the input pixels read in the step c); e) judging, based on the position information, whether or not pixel values of pixels in the vicinity of the corresponding position used for calculation of a pixel value of the predetermined pixel have been read; f) storing, in a case where judgment is made that the pixels in the vicinity of the corresponding position have been read in the step e), pixel values of pixels forming the set of grid points as pixel values of surrounding pixels regarding the predetermined pixel; and g) calculating a pixel value of the predetermined value by interpolation using the pixel values of the surrounding pixels stored in the step f).

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically shows a configuration of an image processing apparatus according to a preferred embodiment of the present invention;

FIG. 2 shows a state of distortion correction processing;

FIG. 4 shows a detailed configuration of a pixel value storage part;

FIG. 5 shows a correspondence relationship between a processing step of the distortion correction processing and the configuration of the distortion correction part;

FIG. 9 shows a relationship between each of corresponding relative positions included in a reference area and a memory state of an associative memory;

FIG. 13 shows a memory state of a local memory;

FIG. 22 shows a relationship between a block in an output image and a corresponding block in an input image; and FIG. 23 shows an imaging apparatus according to yet still another modification.

DESCRIPTION OF THE PREFERRED EMBODIMENT

Figure 3:
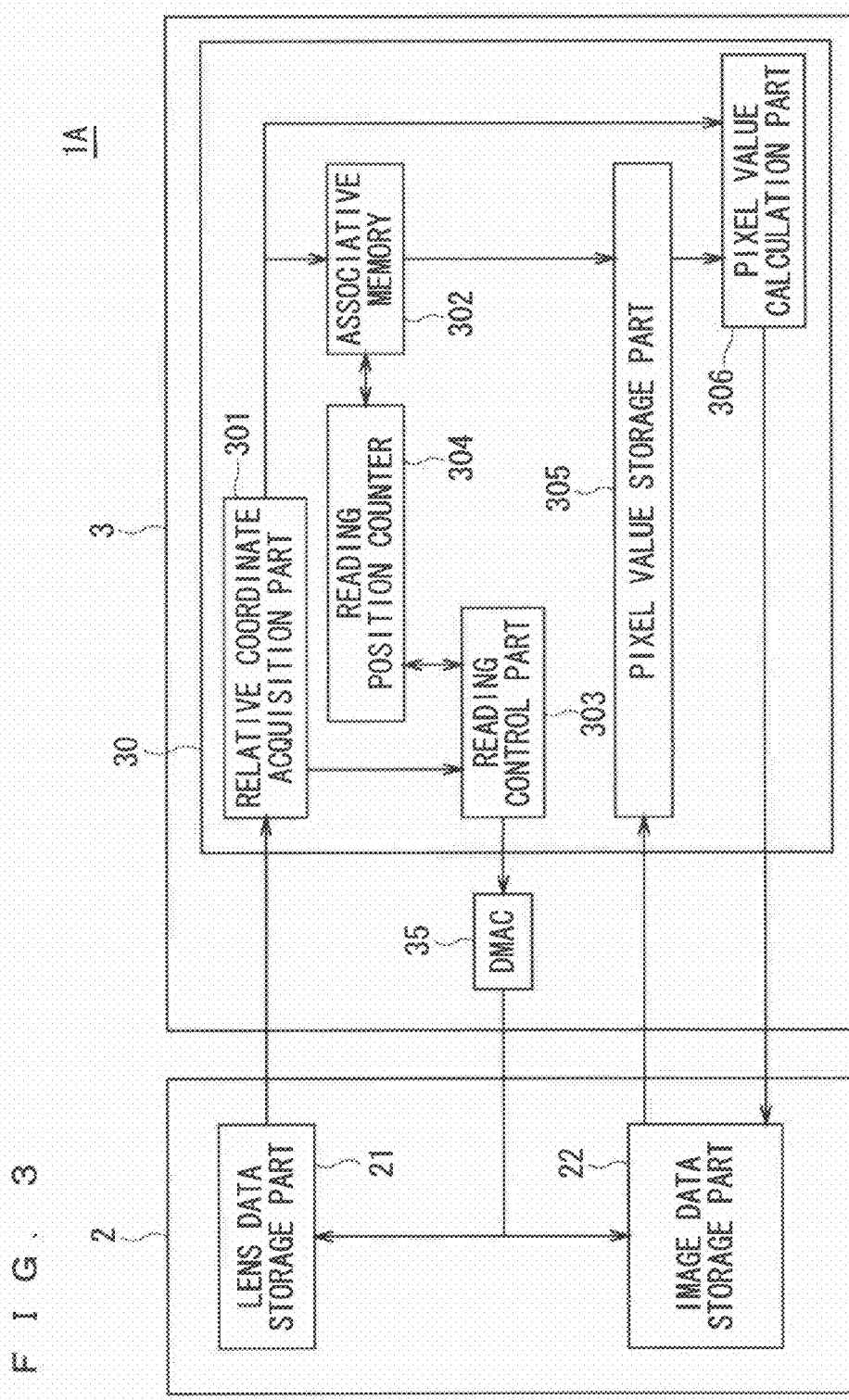
FIG. 3 shows a detailed configuration of a distortion correction part of the image processing apparatus.

Hereinafter, a preferred embodiment of the present invention is described with reference to the drawings.

(1. Preferred Embodiment)

(1-1. Configuration Outline)

FIG. 1 schematically shows the configuration of an image processing apparatus 1A according to the preferred embodiment of the present invention. The image processing apparatus 1A is used in, for example, a personal computer (PC) and a personal digital assistant.

As shown in FIG. 1, the image processing apparatus 1A includes a first processing circuit 2 and a second processing circuit 3 that are formed as integrated circuits on a substrate.

The first processing circuit 2 includes a lens data storage part 21 and an image data storage part 22. The image data storage part 22 is an image memory (for example, DRAM) having a capacity capable of storing a plurality of pieces of image data, and stores image data GD of an input image input to the image processing apparatus 1A. Stored in the lens data storage part 21 is lens data regarding a lens of an imaging apparatus that captures the input image data GD. For example, information regarding distortions of an image (also referred to as "distortion information") resulting from an aberration of a lens is stored as the lens data. The distortion information is described below in detail.

The second processing circuit 3 is formed as an image processing circuit, and performs various types of image processing on the image data GD stored in the image data storage part 22. In particular, the second processing circuit 3 according to the present embodiment includes a distortion correction part 30 that performs the processing of correcting a distortion of an image (also referred to as "distortion correction processing") on the input image data GD.

Description is now given of an outline of the distortion correction processing. FIG. 2 shows a state of the distortion correction processing, which shows an input image IG having a barrel distortion and an output image UG after the distortion correction processing. Note that in the input image IG, a distortion of an object due to distortion is indicated by dashed lines.

As shown in FIG. 2, the distortion correction processing executed by the image processing apparatus 1A is performed for each block (also referred to as "pixel block") BK obtained by dividing the output image UG into a plurality of areas. For example, when a block BK1 is a block (also referred to as "execution target block") BR (hatched area in FIG. 2) that is an execution target of the distortion correction processing, pixel values of respective pixels of the block BK1 are calculated with the use of pixel values (also referred to as "pixel data") of pixels in the vicinity of a corresponding block TB1 corresponding to the block BK1 in the input image IG. In the distortion correction processing, distortion correction in units of blocks BK as described above is executed successively for the respective blocks BK constituting the output image UG, and as a result, the output image UG in which a distortion of a subject is corrected is obtained eventually.

The size of the block BK may be set automatically by the image processing apparatus 1A or may be specified by a user. Hereinafter, there is illustrated a case where distortion correction processing is executed for each block defined by 8 pixels vertically and 8 pixels horizontally, that is, each block BK having 8 by 8 pixels.

Returning back to the description of FIG. 1, the second processing circuit 3 further includes a direct memory access controller (DMAC) 35 that controls data transfer between memories. In the image processing apparatus 1A including the DMAC 35, data transfer between the first processing circuit 2 and the second processing circuit 3 via a bus is performed in response to a control signal from the DMAC 35 in place of a CPU.

(1-2. Distortion Correction Processing)

Figure 6:
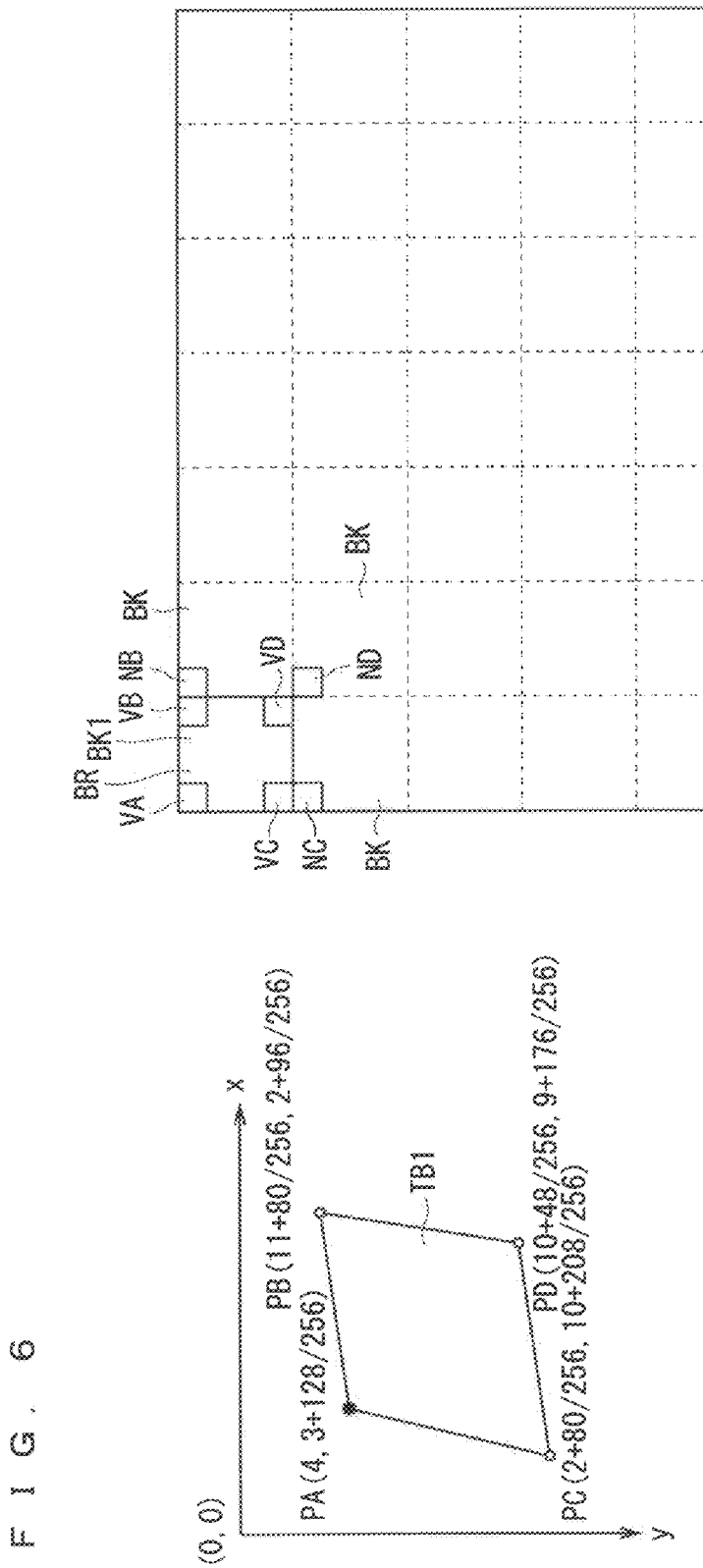
FIG. 6 shows a relationship between an execution target block and a corresponding block that corresponds to the execution target block in an input image.
Figure 7:
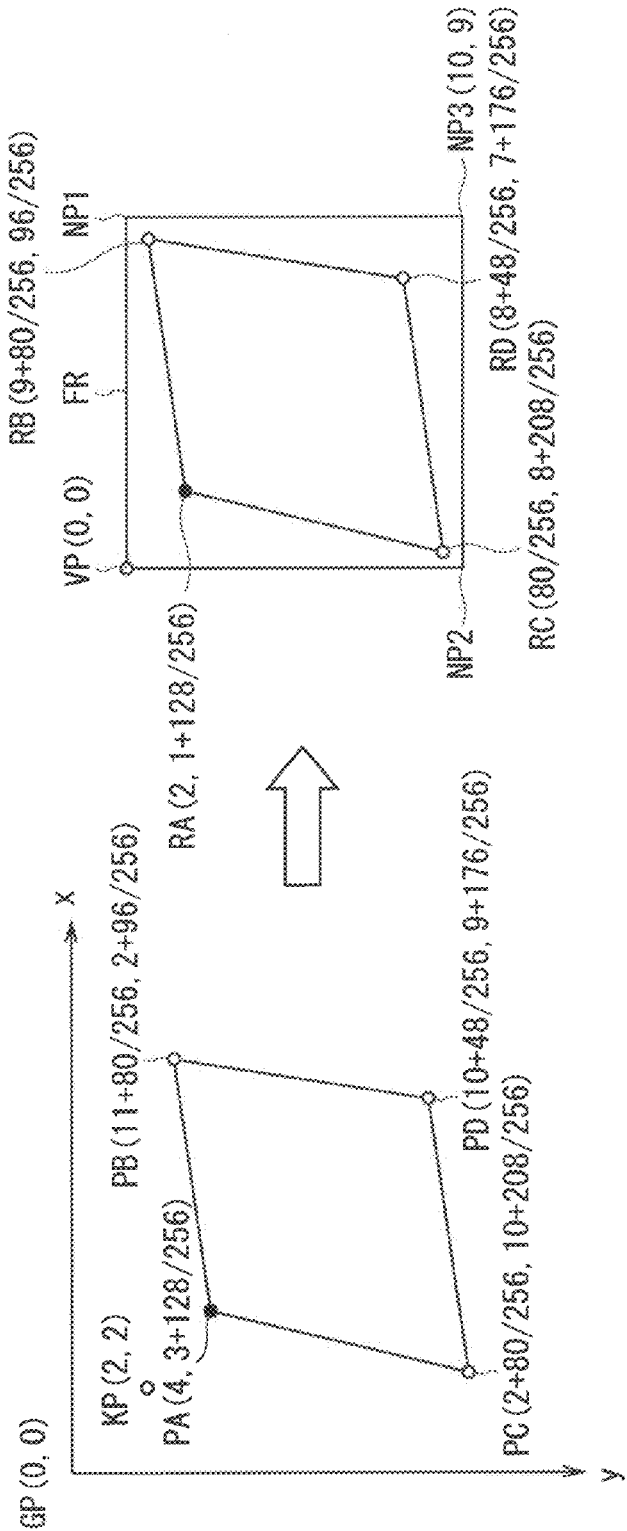
FIG. 7 is a diagram for describing offset processing and reference area setting processing.
Figure 8:
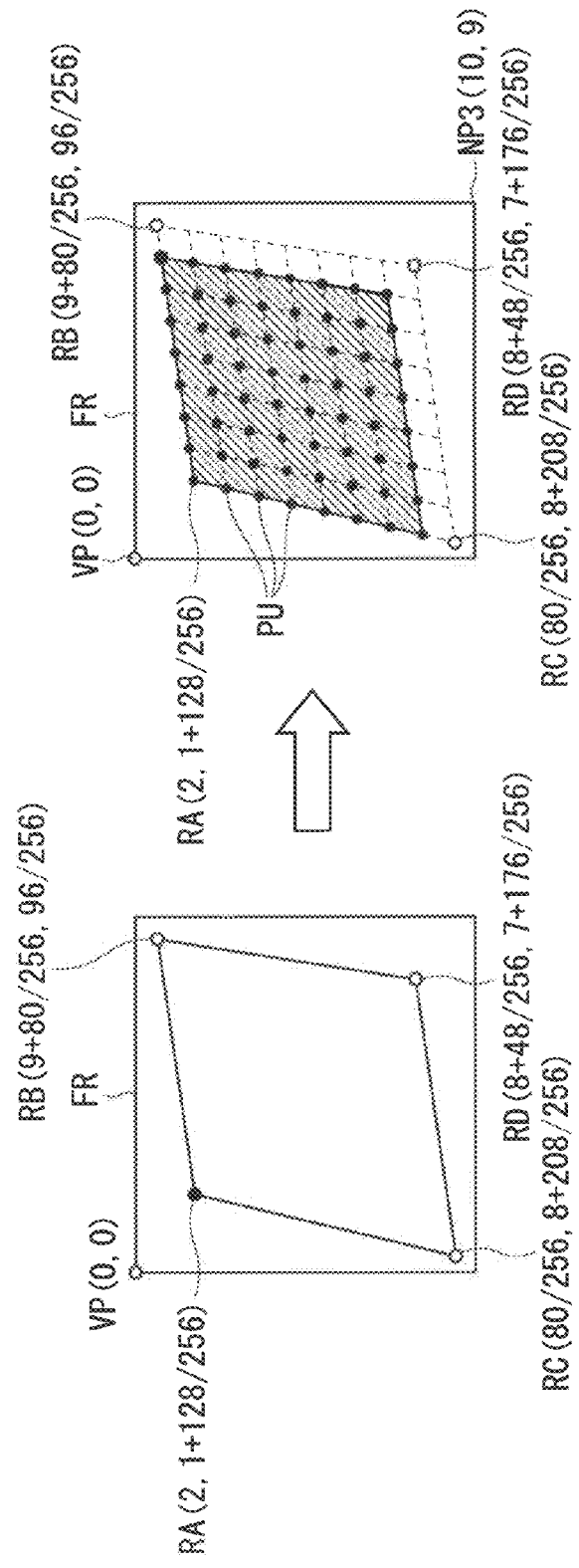
FIG. 8 is a diagram for describing relative coordinate calculation processing.

Description is now given of the distortion correction processing of an image that is executed by the image processing apparatus 1A. FIG. 3 shows a detailed configuration of the distortion correction part 30 of the image processing apparatus 1A. FIG. 4 shows a detailed configuration of a pixel value storage part 305. FIG. 5 shows the correspondence relationship between a processing step of the distortion correction processing and the configuration of the distortion correction part 30. FIG. 6 shows the relationship between the execution target block BR and the corresponding block TB1 corresponding to the execution target block BR in the input image IG. FIG. 7 is a diagram for describing offset processing and reference area setting processing. FIG. 8 is a diagram for describing relative coordinate calculation processing. FIG. 9 shows the relationship between each of corresponding relative positions included in a reference area FR and a memory state of an associative memory 302.

As shown in FIG. 3, the distortion correction part 30 includes a relative coordinate acquisition part 301, an associative memory 302 (content addressable memory (CAM)), a reading control part (reading controller) 303, a reading position counter 304, the pixel value storage part 305 and a pixel value calculation part 306.

The relative coordinate acquisition part 301 has the function of acquiring corresponding positions of respective pixels included in the execution target block BR that is a part of the output image UG on the input image IG.

The associative memory 302 has a storage function of storing information (first storage means) and a search function of searching all pieces of stored information for the information that coincides with the specified information and, in a case where of finding the information that coincides with the specified information, outputting an address in which the coincident information is stored.

The reading control part 303 controls reading of the information stored in the lens data storage part 21 or the image data storage part 22 through the DMAC 35.

The reading position counter 304 has the function of counting reading positions of pixels read from the image data storage part 22 based on the information from the reading control part 303.

As shown in FIG. 4, the pixel value storage part 305 includes a line memory 351 capable of storing pixel values for predetermined amount of pixels, registers RG1 and RG2 capable of temporarily storing pixel values, and a local memory LM composed of a first memory LM1, a second memory LM2, a third memory LM3 and a fourth memory LM4. The pixel value storage part 305 having the above-mentioned configuration has the function of storing pixel values of pixels used in distortion correction among pixel values of the pixels read from the image data storage part 22.

As shown in FIG. 5, the distortion correction processing is executed by the above-mentioned components 301 to 306 of the distortion correction part 30 in cooperation with each other through three processing steps of a relative coordinate acquiring step ST1, a pixel value reading step ST2 and an output pixel value calculating step ST3 for each block BK. Note that the following description is given by taking, as an example, a case where the block BK1 is the execution target block BR of the distortion correction processing as shown in FIG. 2.

In the relative coordinate acquiring step ST1 that is the first processing step, corresponding position specification processing, offset processing, reference area setting processing, relative coordinate calculation processing and relative coordinate storage processing are executed in the stated order. As shown in FIG. 5, the relative coordinate acquisition part 301 performs the corresponding position specification processing, offset processing, reference area setting processing and relative coordinate calculation processing, and the associative memory 302 performs the relative coordinate storage processing.

Specifically, corresponding positions of one vertex pixel among pixels (vertex pixels) positioned at vertices of the execution target block BR and pixels (vertex adjacent pixels) adjacent to the other vertex pixels on the input image IG are respectively specified in the corresponding position specification processing.

More specifically, in the present embodiment, a vertex pixel at the upper left of the execution target block BR is set as one vertex pixel. For example, in a case where the block BK1 is the execution target block BR as shown in FIG. 6, a vertex pixel VA at the upper left of the execution target block BR is one vertex pixel. Further, corresponding positions PA, PB, PC and PD of the vertex pixel VA and vertex adjacent pixels NB, NC and ND respectively adjacent to other vertex pixels VB, VC and VD on the input image IG are individually specified.

The distortion information stored in the lens data storage part 21 is used when specifying corresponding positions of one vertex pixel and vertex adjacent pixels on the input image IG.

Specifically, the distortion information is the information regarding the corresponding positions of a plurality of main pixels on the input image IG that may be vertex pixels of the execution target block on the output image UG, and is stored in the lens data storage part 21 in advance. The corresponding positions on the input image IG that are stored as the distortion information are provided as coordinates when a pixel at the upper left of the input image IG is regarded as an origin GP. In the corresponding position specification processing, the distortion information stored in the lens data storage part 21 is acquired, and the corresponding positions of one vertex pixel and vertex adjacent pixels on the input image IG are respectively specified based on the distortion information.

The specified corresponding positions are provided as coordinates (also referred to as "corresponding coordinates") when the pixel at the upper left of the input image IG is regarded as the origin GP. For example, as shown in FIG. 6, coordinates of the corresponding positions PA, PB, PC and PD are provided with (4, 3+128/256), (11+80/256, 2+96/256), (2+80/256, 10+208/256) and (10+48/256, 9+176/256), respectively.

Note that as shown in FIG. 6, the vertex adjacent pixels NB, NC and ND are pixels at the upper left of the other blocks BK, and thus it suffices that the information regarding the corresponding position of one vertex pixel of each block BK on the input image IG is stored as the distortion information.

In the following offset processing, coordinates of four corresponding positions are converted into relative coordinates from a reference point.

Specifically, among the coordinates of four corresponding positions, the smallest x coordinate and the smallest y coordinate are extracted, and the largest integer (first integer) equal to or smaller than the smallest x coordinate and the largest integer (second integer) equal to or smaller than the smallest y coordinate are specified. Then, the first integer is subtracted from the x coordinate of each of the four corresponding coordinates and the second integer is subtracted from the y coordinate of each of the four corresponding coordinates, to thereby change coordinates of each corresponding position. The coordinates of each corresponding position changed in this manner are relative coordinates when a reference point KP with the first integer as the x coordinate and the second integer as the y coordinate is regarded as the origin.

For example, in FIG. 7, the smallest x coordinate of four corresponding coordinates is "2+80/256" and the smallest y coordinate is "2+96/256", and accordingly the first integer and the second integer are both "2". Then, a relative position (also referred to as "corresponding relative position") RA (2, 1+128/256) is calculated by subtracting the first integer "2" from the x coordinate of the corresponding position PA and subtracting the second integer "2" from the y coordinate of the corresponding position PA. Further, similar computation with the use of the first integer and the second integer is performed on the corresponding positions PB, PC and PD, with the result that relative positions RB, RC and RD are respectively acquired. Note that a reference point KP (2, 2)

serves as an origin of coordinates for defining relative positions, and thus is also referred to as a virtual origin VP.

In the reference area setting processing, the smallest rectangular area including four corresponding relative positions is set as the reference area FR (see FIG. 7).

The reference area FR is set using relative coordinates of four corresponding relative positions. Specifically, the largest x coordinate and the largest y coordinate are extracted from four relative coordinates, and the smallest integer (third integer) equal to or larger than the largest x coordinate and the smallest integer (fourth integer) equal to or larger than the largest y coordinate are specified. Then, a rectangular area, in which the point with the third integer as the x coordinate and the fourth integer as the y coordinate, the point with the third integer as the x coordinate and "0" as the y coordinate, the point with "0" as the x coordinate and the fourth integer as the y coordinate, and the virtual origin VP (0, 0) are vertices, is set as the reference area FR.

For example, in FIG. 7, the largest x coordinate among four relative coordinates is "9+80/256" and the largest y coordinate is "8+208/256", and thus the third integer and the fourth integer are "10" and "9", respectively. That is, in FIG. 7, a rectangular area with a point VP (0, 0), a point NP1 (10, 0), a point NP2 (0, 9) and a point NP3 (10, 9) as vertices is set as the reference area FR.

In the relative coordinate calculation processing, as shown in FIG. 8, relative coordinates of the corresponding relative positions PU of respective pixels (output pixels) constituting the execution target block BR on the input image IG are respectively calculated. The corresponding relative positions PU of the respective output pixels are calculated by interpolation using relative coordinates of corresponding relative positions of one vertex pixel and vertex adjacent pixels on the input image IG. The number of corresponding relative positions PU calculated by interpolation varies depending on the size of the execution target block BR, that is, the number of pixels included in the execution target block BR, and corresponding relative positions of 8 by 8 pixels are calculated in the present embodiment. The respective corresponding relative positions PU are calculated by dividing the distance between the corresponding relative positions of one vertex pixel and vertex adjacent pixels on the input image IG by "8". When the corresponding relative positions PU of the output pixels except for one vertex pixel are calculated by the above-mentioned relative coordinate calculation processing, including the already obtained corresponding relative position of one vertex pixel, the corresponding relative positions of all output pixels constituting the execution target block BR on the input image IG are calculated.

Note that when the corresponding relative positions PU of the output pixels except for one vertex pixel are calculated by division by power of 2, "8", the corresponding relative positions can be calculated by bit shift, which makes it possible to increase the speed of computation. That is, in the present embodiment, the number of pixels included in the block BK is preferably set to be the power of 2.

In the relative coordinate storage processing, the position information of the corresponding relative positions of all output pixels constituting the execution target block BR on the input image IG is written into the associative memory 302. Writing into the associative memory 302 is performed by specifying an address of a storage destination for each corresponding relative position, and the integer part of the relative coordinates of one output pixel is stored in one address as the position information of the corresponding relative position.

For example, in the reference area FR shown in FIG. 9, the integer part (2, 1) of the relative coordinates of a corresponding relative position RA at the upper left of the corresponding relative positions included in the reference area FR is written into an address 0 of the associative memory 302. Next, the integer part (3, 1) of the relative coordinates of a corresponding relative position PU1 adjacent to the corresponding relative position RA in the same row is written into an address 1 of the associative memory 302. After that, the integer parts of the relative coordinates of respective corresponding relative positions in the same row are sequentially written into predetermined addresses ("2" to "7") of the associative memory 302. Then, after writing of the corresponding relative positions in the same row is finished, writing is moved to the following row and writing of the corresponding relative positions is performed. That is, the integer part (1, 2) of the relative coordinates of a corresponding relative position PU8 is written into an address 8 of the associative memory 302, and thereafter, the integer parts of the relative coordinates of the respective corresponding relative positions in the same row starting from the corresponding relative position PU8 are written into the associative memory 302. The above-mentioned writing of the position information of the corresponding relative positions into the associative memory 302 proceeds on a row-by-row basis, and then finishes at the time when the position information of the last corresponding relative position included in the reference area FR is written into an address 63 of the associative memory 302.

As described above, the storage processing of position information of corresponding relative positions included in a reference area is sequentially performed along a given row direction with the corresponding relative position at the upper left of the reference area being the starting point (origin).

Note that the addresses of the specified storage destinations of the respective corresponding relative positions can be regarded as serial numbers regarding respective corresponding relative positions in a reference area. Further, in the present embodiment, sequencing of pixels when pixels (or positions) are sequentially read along a given row direction from an origin pixel on an image (or predetermined area) is also referred to as a raster sequence.

Figure 10:
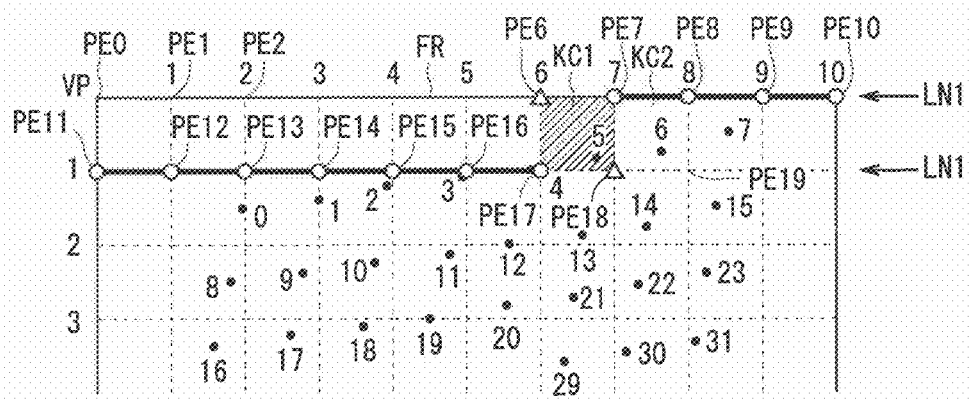
FIG. 10 shows a part of the reference area.

As shown in FIG. 5, the distortion interpolation processing proceeds to the pixel value reading step ST2 after the relative coordinate acquiring step ST1 is completed. In the pixel value reading step ST2, pixel value read processing, coordinate search processing and specific pixel value storage processing are executed. FIG. 10 shows a part of the reference area FR.

Specifically, in the pixel value reading processing, pixel values of input pixels included in the reference area among the pixels constituting the input image IG are read from the image data storage part 22 in a raster sequence by control of the reading control part 303, and are sequentially input to the pixel value storage part 305.

As shown in FIG. 4, in the pixel value storage part 305, the pixel values of the pixels input from the image data storage part 22 are input to the line memory 351.

The line memory 351 has the capacity capable of storing pixel values of pixels for one row (for one line) in the reference area and has the function of processing data in a so-called FIFO system. That is, the line memory 351 outputs the pixel value that has been stored first upon input of a pixel value of a new pixel in a state in which the pixel values for one line in the reference area are stored.

The pixel value for one pixel output from the line memory 351 is directly input to the first memory LM1 of the local memory LM and is input to the second memory LM2 of the local memory LM through the register RG1 capable of holding a pixel value for one pixel.

In the pixel value storage part 305 having the above-mentioned configuration, the pixel value of the pixel output earlier than the pixel value of the pixel input to the first memory LM1 by one pixel is input to the second memory LM2. Specifically, in a case where a pixel value of a predetermined first pixel output from the line memory 351 is input to the first memory LM1, a pixel value output earlier than the above-mentioned predetermined first pixel by one pixel (pixel value of the pixel earlier by one pixel) is input to the second memory LM2.

Further, in the pixel value storage part 305, the pixel value of the pixel input from the image data storage part 22 is directly input to the third memory LM3 of the local memory LM and is input to the fourth memory LM4 of the local memory LM through the register RG2 capable of holding a pixel value for one pixel, in addition to the line memory 351.

As a result, a pixel value of a pixel input to the pixel value storage part 305 input earlier than a pixel value of a pixel input to the third memory LM3 by one pixel is input to the fourth memory LM4. More specifically, in a case where a pixel value of a predetermined second pixel input to the pixel value storage part 305 is stored in the third memory LM3, a pixel value of a pixel input earlier than the predetermined second pixel by one pixel (pixel value of a pixel earlier by one pixel) is input to the fourth memory LM4.

A memory state of a pixel in the pixel value storage part 305 is now described in detail.

For example, in the reference area FR shown in FIG. 10, the input pixels included in the reference area FR are input to the pixel value storage part 305 in a raster sequence from a pixel PE0 positioned at a virtual origin VP by the pixel value reading processing. That is, in the pixel value reading processing, reading of pixel values is started from the pixel PE0 of a first row LN1 in the reference area FR, and when reading of pixel values up to a pixel PE 10 in the first row LN1 is finished, reading of pixel values of a second row LN2 is started from a pixel PE11. After that, reading of pixel values is performed sequentially until pixel values of the all input pixels included in the reference area FR are read.

The pixel values of pixels for one line in the reference area are stored in the line memory 351 by the above-mentioned pixel value reading processing. For example, there is assumed a case where a pixel value of a pixel PE18 in the second row LN2 is read from the image data storage part 22 and is input to the pixel value storage part 305.

In this case, pixels for one line immediately before the pixel PE18, that is, pixel values of 11 pixels PE7 to PE17, from a pixel PE7 of the first row LN1 to a pixel PE17 of the second row LN2, are stored in the line memory 351. Further, in this case, the pixel value of the pixel PE6 of the first row LN1 output from the line memory 351 last time is held in the register RG1, and the pixel value of the pixel PE17 of the second row LN2 input to the pixel value storage part 305 last time is held in the register RG2.

In this state, the pixel value of the pixel PE18 is input to the pixel value storage part 305 as assumed above, and accordingly the pixel value of the pixel PE7 output from the line memory 351 is stored in the first memory LM1. The pixel value of the pixel PE6 held in the register RG1 is stored in the second memory LM2. The input pixel value of the pixel PE18 is stored as it is in the third memory LM3. The pixel value of the pixel PE17 held in the register RG2 is stored in the fourth memory LM4.

Taking positions of the respective pixel values stored in the local memory LM, it is found that pixel values of the pixels (also referred to as "grid pixels") positioned at respective grid points of the grids (spatial grids) defined by relative coordinates of the integers set in the reference area FR are stored in the local memory LM. For example, in the assumption above in which the pixel value of the pixel PEI 8 of the second row LN2 is input to the pixel value storage part 305, the respective pixel values of the pixels PE6, PE7, PE17 and PE18 positioned at grid points of a grid KC1 (see obliquely hatched area in FIG. 10) are stored in the local memory LM.

Then, the pixel values stored in the local memory LM are updated while changing a position of a grid to be a storage target every time a pixel value of a new pixel is input from the image data storage part 22. For example, the assumption above proceeds further, and a pixel value of a next pixel PE19 (that is, pixel PE19 adjacent to the pixel PE18) is input to the pixel value storage part 305, and accordingly the respective pixel values of the pixels PE7, PE8, PE18 and PE19 positioned at grid points of a grid KC2 are stored in the local memory LM.

As described above, the pixel value storage part 305 has an organization function (organization means) of organizing a set of grid points constituting a predetermined grid by rearranging pixels among input pixels, and causes the pixel values of the grid pixels organized by the organization function to be input to the local memory LM.

Figure 11:
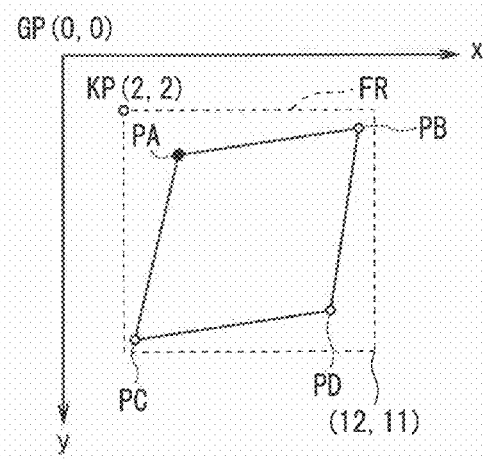
FIG. 11 is a diagram in which reference areas are superimposed on an input image to be displayed.

Note that in reading an input pixel from the image data storage part 22, a pixel value from a reference point on the input image IG is read, to thereby achieve reading for a reference area. FIG. 11 is a diagram in which the reference areas FR superimposed on the input image IG to be displayed. For example, in the reference area FR shown in FIG. 11, reading of pixel values is started from a pixel positioned at a reference point KP (2, 2) and reading of pixel values is performed up to a pixel positioned at an endpoint EP (12, 11). As described above, in the present embodiment, pixel data of pixels present in the reference area is read by setting the reference area, and thus the time required for reading can be reduced compared with a case where pixel data of all pixels on the input image IG is read. In addition, the capacity of the memory for storing the read pixel data can be set small, which makes it possible to reduce a circuit size.

Figure 12:
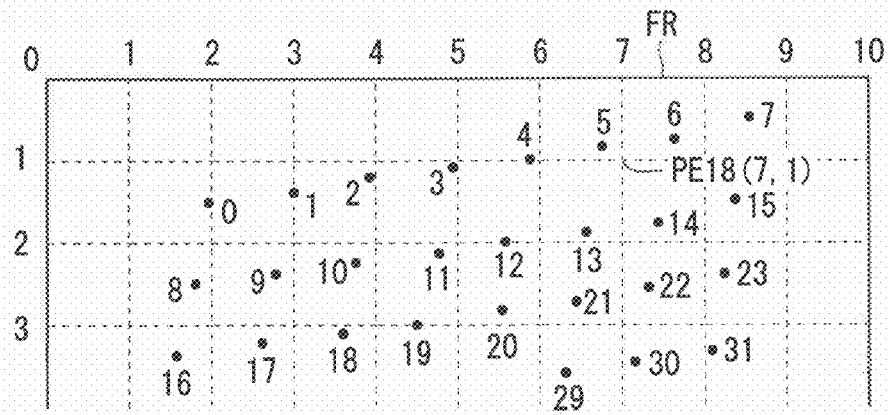
FIG. 12 shows a relationship between each of corresponding relative positions included in the reference area and a memory state of an associative memory.

Returning back to FIG. 5, in the coordinate search processing in the pixel value reading step ST2, there is performed the processing of searching the position information of the corresponding relative positions stored in the associative memory 302 for the position information regarding the reading position of the pixel input to the pixel value storage part 305 from the image data storage part 22, by the associative memory 302 and the reading position counter 304 in cooperation with each other. FIG. 12 shows the relationship between each of the corresponding relative positions included in the reference area FR and the memory state of the associative memory 302.

Specifically, when reading of the input pixels included in the reference area is started from the image data storage part 22, the reading positions of the read pixels are counted in the reading position counter 304 in accordance with the control of the reading control part 303. The reading positions are counted by updating the coordinates indicating reading positions in the reference area in accordance with reading of the input pixels. Then, after the reading position is updated, the updated reading position is output to the associative memory 302.

In the associative memory 302, the position information of coordinates whose x coordinate and y coordinate are both smaller than the coordinates of the input reading position by "1" is searched from the position information of corresponding relative positions stored in the associative memory 302. In a case where the position information smaller than the coordinates of the input reading position by (1, 1) is found from the position information of the corresponding relative positions stored in the associative memory 302 as a result of the search, the associative memory 302 outputs an address in which the position information of the corresponding relative position is stored, in other words, a signal including a serial number of the corresponding relative position to the pixel value storage part 305.

For example, in a case where a pixel value of the pixel PE18 is read from the image data storage part 22 as shown in FIG. 12, the coordinates (7, 1) of the pixel PE18 in the reference area FR are input from the reading position counter 304 to the associative memory 302. In the associative memory 302, the position information having coordinates (6, 0) smaller than the coordinates (7, 1) of the input reading position by (1, 1) is searched from the position information of the corresponding relative positions stored in the associative memory 302. As shown in FIG. 12, the position information of the corresponding relative position of the coordinates (6, 0) is stored in an address "5" in the associative memory 302, and thus the associative memory 302 outputs the serial number "5" to the pixel value storage part 305.

Figure 14:
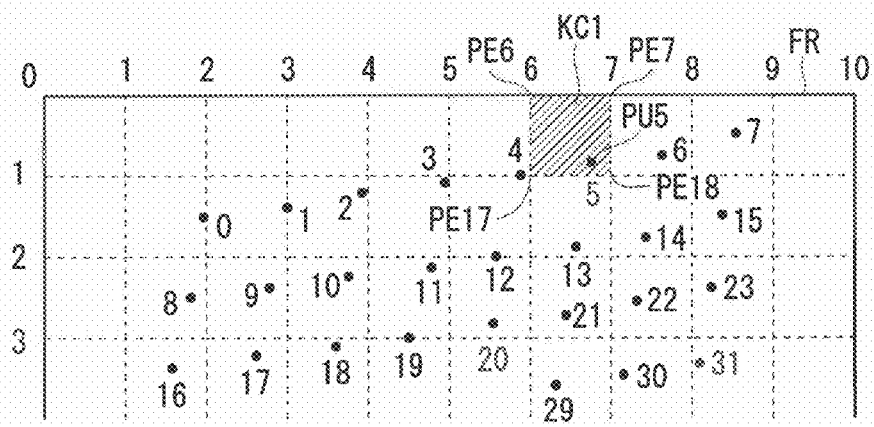
FIG. 14 shows a memory state of a local memory.

The above-mentioned coordinate search processing is performed in parallel with the pixel value reading processing, and in the following specific pixel value storage processing (see FIG. 5), the processing in which the processing results of the coordinate search processing and the processing results of the pixel value reading processing are reflected is performed. FIG. 13 shows the memory state of the local memory LM. FIG. 14 shows a part of the reference area FR.

Specifically, in the specific pixel value storage processing, storage processing of each pixel value stored in the local memory LM is performed in response to a signal input from the associative memory 302. More specifically, in the specific pixel value storage processing, when a signal is input from the associative memory 302, pixel values temporarily stored in the local memory LM at the time of input of the signal are stored as specific pixel values in the addresses specified by the serial numbers included in the signal.

For example, in the assumption above in which the pixel value of the pixel PE18 is read from the image data storage part 22, the respective pixel values of the pixels PE6, PE7, PE17 and PE18 are temporarily stored in the local memory LM by the pixel value reading processing, and a signal including the serial number "5" is output to the pixel value storage part 305 by the coordinate search processing. When the specific pixel value storage processing is executed in this state, as shown in FIG. 13, a pixel value PV (6, 0) of the pixel PE6, a pixel value PV (7, 0) of the pixel PE7, a pixel value PV (6, 1) of the pixel PE17 and a pixel value PV (7, 1) of the pixel PE18 that are temporarily stored in the local memory LM are stored in the address "5" specified by the serial number "5" in the local memory LM. More specifically, the pixel values temporarily stored in the first memory LM1, the second memory LM2, the third memory LM3 and the fourth memory LM4 in the local memory LM are stored in the addresses "5" of the first memory LM1, the second memory LM2, the third memory LM3 and the fourth memory LM4, respectively.

On this occasion, the respective pixel values stored in the addresses "5" of the local memory LM become the pixel values of the pixels PE6, PE7, PE17 and PE18 positioned at grid points of the grid KC1 containing the corresponding relative position PU5 with the serial number "5" as described above (see FIG. 14). That is, in a case where the pixel value of the pixel PE18 is read from the image data storage part 22, the pixel values of the grid pixels PE6, PE7, PE17 and PE18 containing the corresponding relative position PU5 are stored in the local memory LM.

The processing of storing pixel values of the grid pixels including the corresponding relative position (also referred to as "containing grid pixels") as described above is performed for the all corresponding relative positions in the reference area. That is, in the specific pixel value storage processing, the pixel values of four containing grid pixels regarding the corresponding relative positions included in the reference area are stored in a predetermined address of the local memory LM as specific pixel values.

As described above, in the pixel value reading step ST2, whether or not a containing grid pixel containing a corresponding relative position has been read is judged every time an input pixel included in a reference area is read from the image data storage part 22. Then, in a case where it is judged that a containing grid pixel containing a given corresponding relative position has been read, a pixel value of this containing grid pixel is stored in association with the identification number (serial number in this case) of the given corresponding relative position.

Note that whether or not a containing grid pixel has been read is judged by the search function of the associative memory 302, and thus the associative memory 302 is also referred to as functioning as judgment means as to whether or not a containing grid pixel is read. Further, the containing grid pixel becomes a pixel in the vicinity of the corresponding relative position (also referred to as "surrounding pixel) used for calculating a pixel value of an output pixel corresponding to a corresponding relative position by pixel value calculation processing described below.

Figure 15:
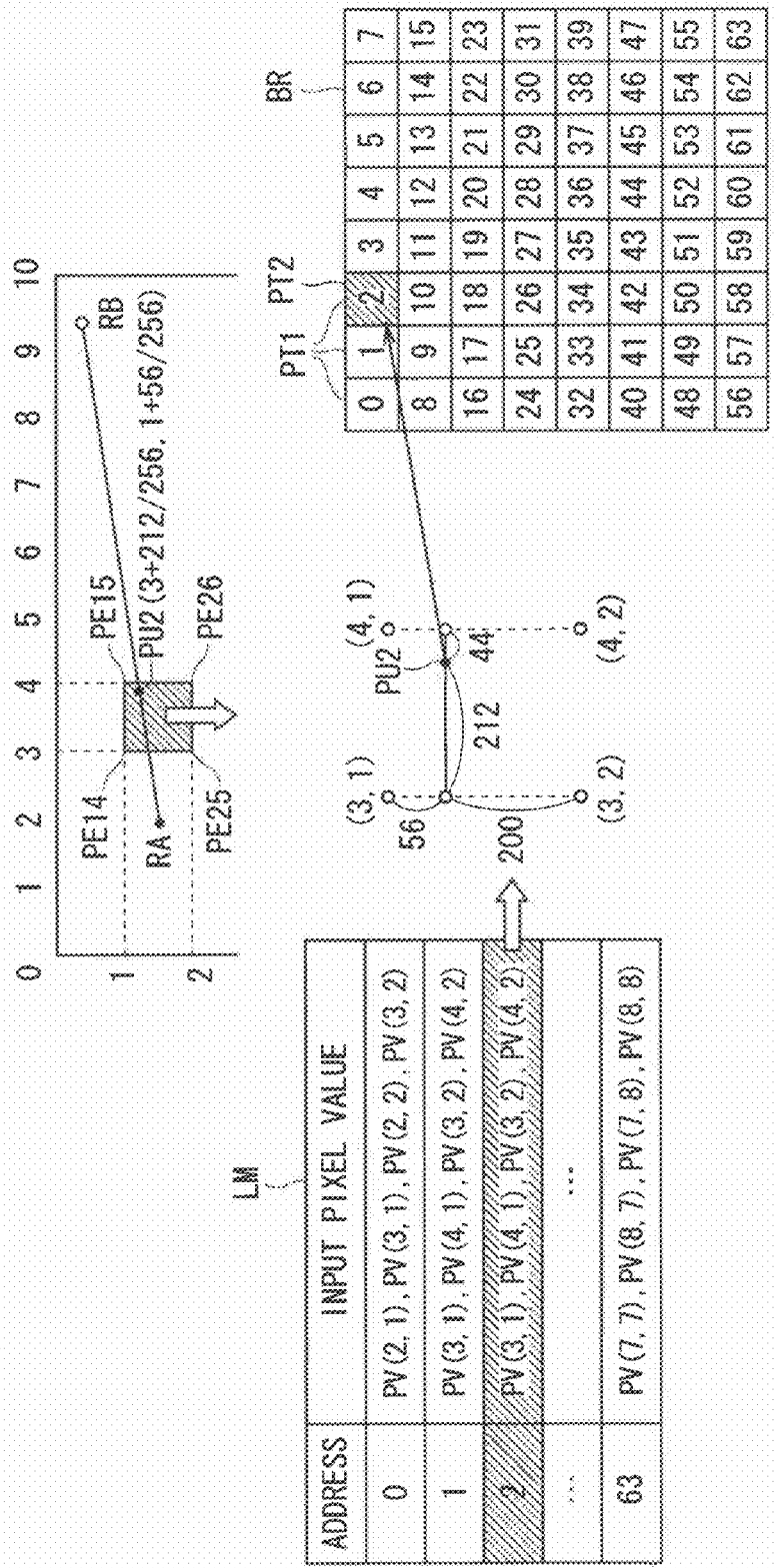
FIG. 15 shows a state of calculation of an output pixel value.

As shown in FIG. 5, after the pixel value reading step ST2 is completed, the distortion correction processing proceeds to the output pixel value calculating step ST3. In the output pixel value calculating step ST3, the relative coordinate acquisition processing and the pixel value calculation processing are executed. FIG. 15 shows the state of calculation of an output pixel value.

The relative coordinate acquisition processing is executed by the relative coordinate acquisition part 301, and relative coordinates of the corresponding relative positions of all output pixels constituting the execution target block BR on the input image IG are obtained. The relative coordinates of the corresponding relative positions are acquired by executing the above-mentioned corresponding position specification processing, offset processing, reference area setting processing and relative coordinate calculation processing again. Alternatively, in the relative coordinate acquiring step ST1, the calculated relative coordinates of the corresponding relative positions may be once stored and the stored relative coordinates of the corresponding relative positions may be used.

The pixel value calculation processing is executed by the pixel value calculation part 306, and by bilinear interpolation in which relative coordinates of a corresponding relative position and a pixel value of a containing grid pixel regarding the corresponding relative position, a pixel value at the corresponding relative position is calculated.

For example, in a case where a pixel value at a corresponding relative position PU2 of the serial number "2" is calculated as shown in FIG. 15, pixel values of containing grid pixels stored in the address "2" of the local memory LM are read, and the pixel value at the corresponding relative position PU2 is calculated by bilinear interpolation using relative coordinates of the corresponding relative position PU2 and pixel values PV (3, 1), PV (4, 1), PV (3, 2) and PV (4, 2) of four containing grid pixels PE14, PE15, PE25 and PE26. Then, the pixel value of the corresponding relative position PU2 calculated by the pixel value calculation processing is output as a pixel value of the corresponding output pixel PT2 in the execution target block BR of the output image UG.

The calculation processing for a pixel value at a corresponding relative position as described above is performed by sequentially reading pixel values of four containing grid pixels stored in the local memory LM for each address. Accordingly, the pixel values of the output pixels are output from the pixel value calculation part 306 in a raster sequence in the execution target block BR of the output image UG.

Specifically, pixel values of four containing grid pixels used in calculation of pixel values for the respective output pixels are stored in the local memory LM in a raster sequence on the output image UG.

Therefore, the pixel value calculation part 306 calculates the pixel values of the corresponding relative positions with the use of pixel values of containing grid pixels that are input based on the storage sequence indicated by the storage addresses of the local memory LM and sequentially outputs the calculated pixel values as pixel values of the output pixels, with the result that the pixel values of the output pixels are output from the pixel value calculation part 306 in a raster sequence in the execution target block BR of the output image UG. Note that the pixel values of the output pixels output from the pixel value calculation part 306 are transferred to the image data storage part 22 and are sequentially stored in the output image storage area of the image data storage part 22.

As described above, the image processing apparatus 1A includes: the relative coordinate acquisition part 301 that acquires a relative position on an input image with respect to an output pixel in the output image UG; the first storage means that stores position information of the corresponding position; the reading control part 303 that causes the pixel values of the input pixels in the input image IG to be read sequentially; the organization means that receives the pixel values of the input pixels read by the reading control part 303 and organizes a set of grid points formed of input pixels among the input pixels; the judgment means that judges whether or not pixel values of surrounding pixels in the vicinity of the corresponding position used in calculation of a pixel value of an output pixel based on the position information stored in the first storage means; the local memory LM that stores the pixel values of pixels forming the set of grid points as pixel values of the surrounding pixels regarding predetermined pixel in a case where it is judged that the surrounding pixels have been read by the judgment means; and the pixel value calculation part 306 that calculates the pixel value of the predetermined pixel by interpolation using the pixel values of the surrounding pixels stored in the local memory LM.

According to the image processing apparatus 1A as described above, it is possible to calculate a pixel value of an output pixel based on pixel values of input pixels while sequentially reading the pixel values of the input pixels. This enables to reduce a reduction in use efficiency of a bus resulting from transfer of image data of an input image, that is, alleviate malfunctions resulting from the transfer of image data.

(2. Modifications)

While the preferred embodiment of the present invention is descried above, the present invention is not limited to the description above.

Figure 16:
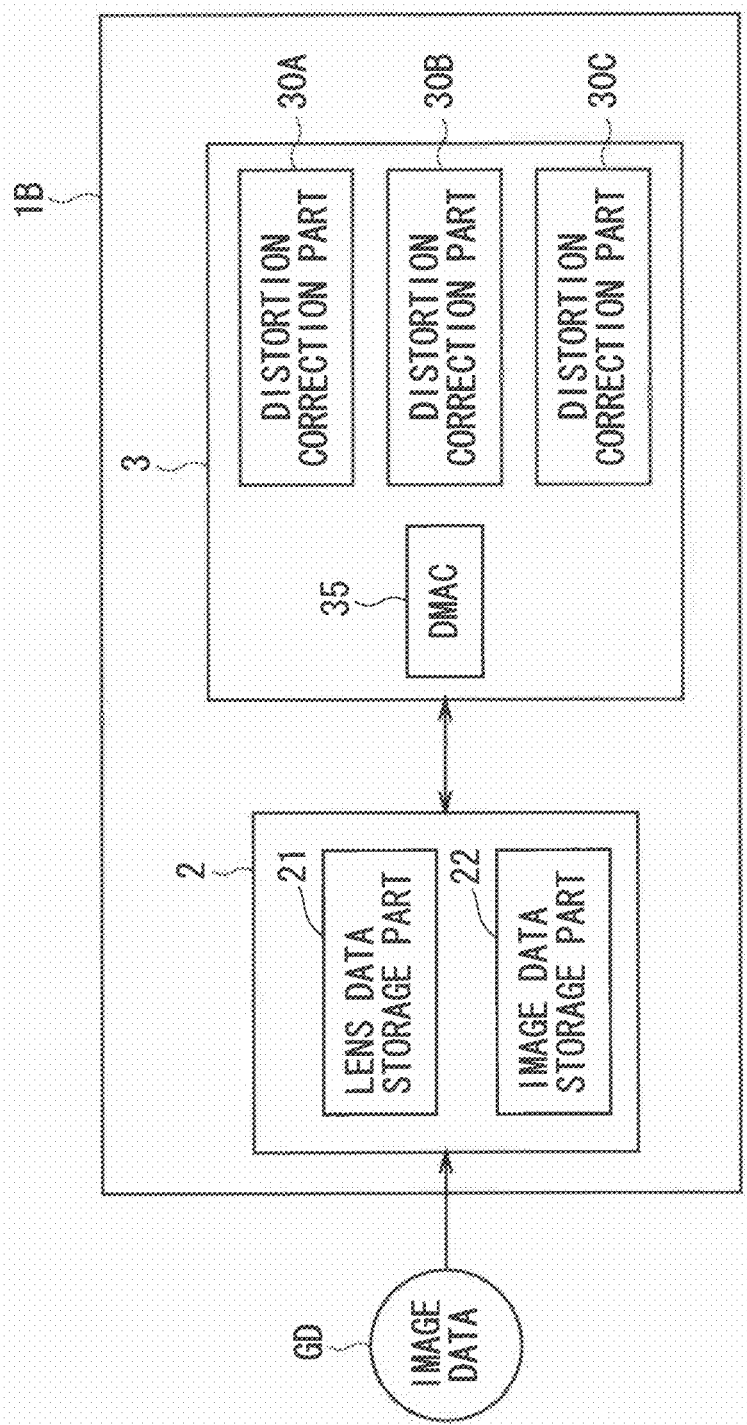
FIG. 16 schematically shows a configuration of an image processing apparatus according to a modification.

For example, while one distortion correction part 30 is provided in the configuration according to the preferred embodiment above, not limited thereto, and a plurality of distortion correction parts may be provided. FIG. 16 schematically shows the configuration of an image processing apparatus 1B according to a modification.

Specifically, in the image processing apparatus 1B shown in FIG. 16, a plurality of distortion correction parts 30A to 30C are provided in the second processing circuit 3. In the image processing apparatus 1B, the respective distortion correction parts 30A to 30C perform distortion correction processing for different blocks BK in the same output image UG in parallel with each other. In this manner, a plurality of distortion correction parts 30A to 30C are provided and the distortion correction processing is performed in parallel with each other, with the result that a throughput can be improved and the speed of distortion correction processing can be increased.

Note that in a case where the distortion correction processing is executed in parallel with each other, the distortion correction processing in the distortion correction parts 30A to 30C may be executed by shifting the processing steps ST1 to ST3 of the distortion correction processing. For example, in a case where the processing step of the distortion correction processing executed by the distortion correction part 30A is the relative coordinate acquiring step ST1, the execution timing of the distortion correction processing is shifted so as to be the image value reading step ST2 in the distortion correction part 30B and the output pixel value calculating step ST3 in the distortion correction part 30C. When the timing of executing the distortion correction processing is shifted in the distortion correction parts 30A to 30C in this manner, the use of a bus in the distortion correction processing can be dispersed, which increases the use efficiency of a bus.

Figure 17:
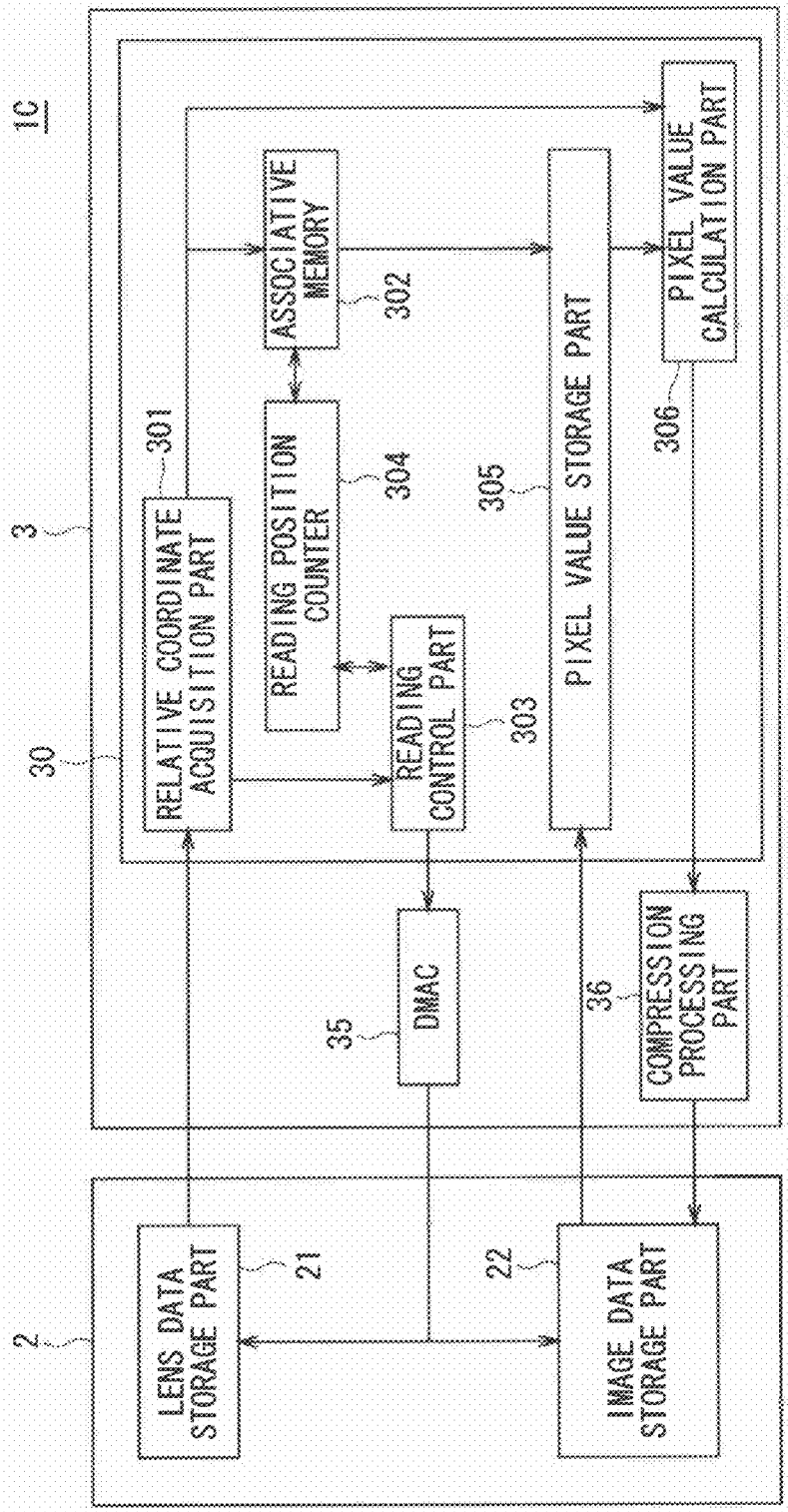
FIG. 17 shows a configuration of an image processing apparatus according to another modification.
Figure 18:
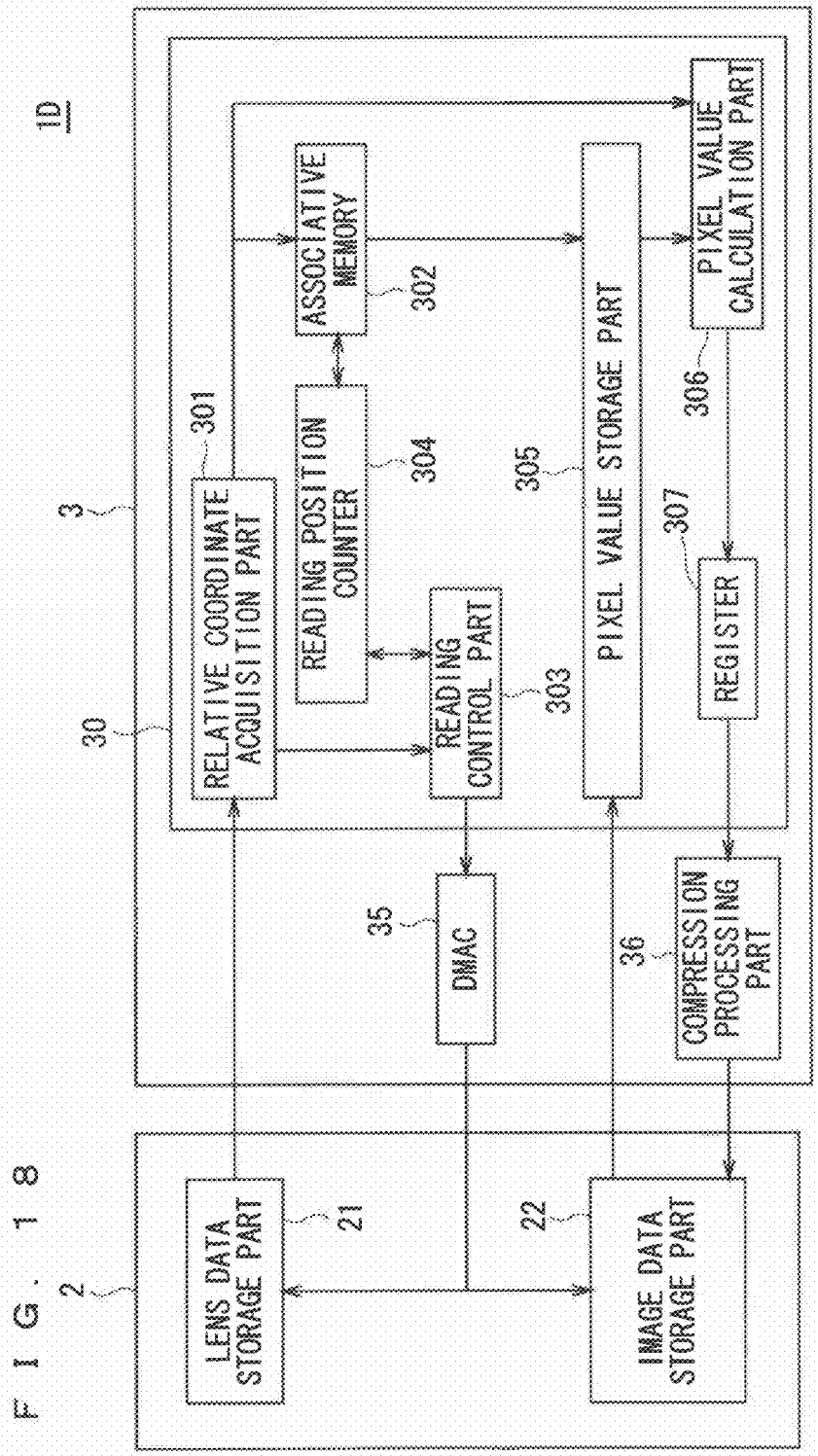
FIG. 18 shows a configuration of an image processing apparatus according to still another modification.
Figure 19:
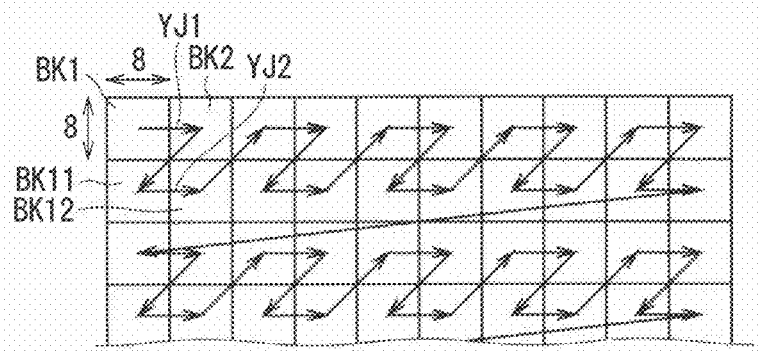
FIG. 19 shows a sequence of outputting image data.

Further, in the image processing apparatus 1A according to the preferred embodiment above, a compression processing part 36 may be further provided downstream of the distortion correction part 30. FIG. 17 shows the configuration of an image processing apparatus 1C according to another modification. FIG. 18 shows the configuration of an image processing apparatus 1D according to still another modification. FIG. 19 shows an output sequence of image data.

Specifically, the image processing apparatus 1C of FIG. 17 includes the compression processing part 36 in the second processing circuit 3, and the compression processing part 36 performs compression processing on the image data input from the pixel value calculation part 306 by, for example, the JPEG method. In this case, compression processing of an image is performed in units of blocks by dividing an image into blocks having a predetermined size (for example, 8 by 8 pixels), and thus it is preferable that the compression processing part 36 be disposed downstream of the distortion correction part 30 in terms of circuit configuration.

Specifically, the distortion correction processing by the distortion correction part 30 is performed for each block, and image data subjected to the distortion correction processing is output from the distortion correction part 30 in units of blocks. For this reason, the image data in units of blocks is input to the compression processing part 36 when the compression processing part 36 is provided downstream of the distortion correction part 30, and thus the compression processing part 36 is capable of performing compression processing on the input image data in units of blocks without a change. As described above, with the compression processing part 36 provided downstream of the distortion correction part 30, the distortion correction processing and the compression processing can be performed successively without providing a storage part (for example, register) for temporarily storing the image data, which enables simplification of a circuit configuration.

Alternatively, as shown in FIG. 18, an output format of image data from the distortion correction part 30 can be changed by providing a register 307 downstream of the pixel value calculation part 306 in the distortion correction part 30. Specifically, in a case where image data is output in units of blocks of 16 by 16 pixels, as shown in FIG. 19, the image data for each block BK of 8 by 8 pixels output from the pixel value calculation part 306 is once stored in the register 307. Then, the image data is output in a sequence indicated by arrows as soon as the image data can be output in units of blocks of 16 by 16 pixels. For example, image data indicated by an arrow YJ1 is output when the image data of the block BK1 and the image data of the block BK2 are stored in the register 307, and image data indicated by an arrow YJ2 is output when the image data of the block BK11 and the image data of the block BK12 are stored in the register 307.

Figure 20:
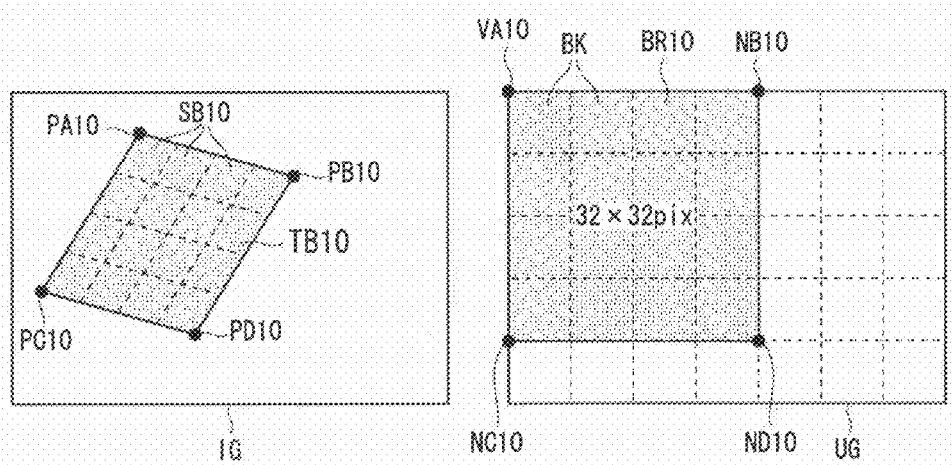
FIG. 20 shows a relationship between an execution target block and a corresponding block that corresponds to the execution target block in an input image.
Figure 21:
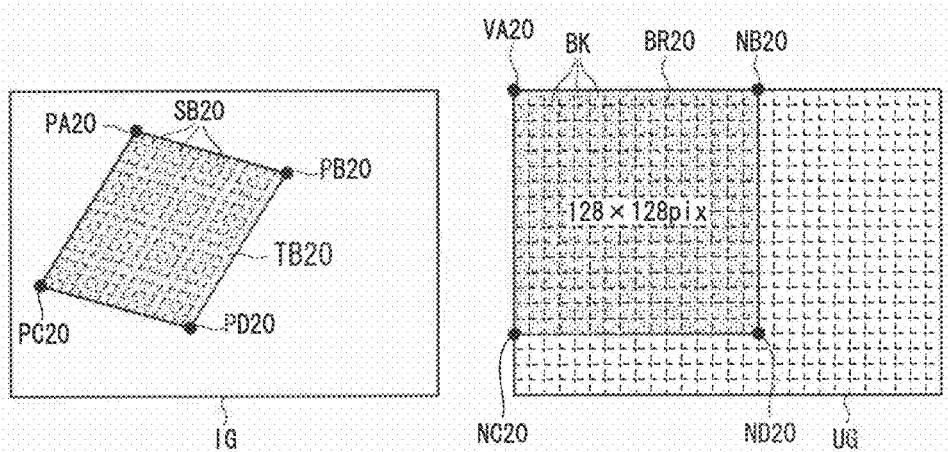
FIG. 21 shows another relationship between an execution target block and a corresponding block that corresponds to the execution target block in an input image.

Further, the case where the size of the execution target block BR is 8 by 8 pixels is illustrated in the preferred embodiment above, which is not limited thereto, and the size of the execution target block BR may be 32 by 32 pixels or 128 by 128 pixels. FIG. 20 shows the relationship between an execution target block BR10 and a corresponding block TB10 corresponding to the execution target block BR10 in the input image IG. FIG. 21 shows the relationship between an execution target block BR20 and a corresponding block TB20 corresponding to the execution target block BR20 in the input image IG.

For example, in a case where the size of the execution target block BR is 32 by 32 pixels, blocks BK of 4 by 4 are connected as one group as shown in FIG. 20, whereby an execution target block BR10 of 32 by 32 pixels is formed.

In the distortion correction processing with respect to the execution target block BR10, corresponding positions PA10, PB10, PC10 and PD10 of one vertex pixel VA10 of the execution target block BR10 and vertex adjacent pixels NB10, NC10 and ND10 on the input image IG are specified using the distortion information. Further, the corresponding positions of the respective output pixels constituting the execution target block BR10 on the input image IG are respectively calculated by interpolation.

Thereafter, the distortion correction processing is performed for each small block SB10 in the input image IG. That is, pieces of processing from the reference area setting processing to the pixel value calculation processing shown in FIG. 5 are executed in units of small blocks SB 10, to thereby obtain pixel values of output pixels.

Alternatively, in a case where the size of the execution target block BR is 128 by 128 pixels, blocks BK of 16 by 16 are connected as one group as shown in FIG. 21, whereby the execution target block BR20 of 128 by 128 pixels is formed.

In the distortion correction processing with respect to the execution target block BR20, corresponding positions PA20, PB20, PC20 and PD20 of one vertex pixel VA20 of the execution target block BR20 and the vertex adjacent pixels NB20, NC20 and ND20 on the input image IG are specified using the distortion information. Further, the corresponding positions of the respective output pixels constituting the execution target block BR20 on the input image IG are respectively calculated by interpolation.

Thereafter, the distortion correction processing is performed for each small block SB20 on the input image IG. That is, pieces of processing from the reference area setting processing to the pixel value calculation processing shown in FIG. 5 are executed in units of small blocks SB 20, to obtain acquire pixel values of output pixels.

In this manner, when the distortion correction processing is performed by increasing the size of the execution target block BR, the number of calculating the corresponding positions of one vertex pixel and vertex adjacent pixels on the input image IG using the distortion information can be reduced. This enables a reduction in information amount of the distortion information stored in the lens data storage part 21.

One vertex pixel of the block BK and three vertex adjacent pixels on the output image UG may have any positional relationship of the corresponding positions on the input image IG. That is, the positional relationship between one vertex pixel and three vertex adjacent pixels regarding the block BK may be different from the positional relationship of the corresponding positions between one vertex pixel of the block BK and three vertex adjacent pixels on the input image IG. FIG. 22 shows the relationship between the blocks BK1 and BK2 on the output image and the corresponding blocks TB1 and TB2 on the input image IG.

For example, FIG. 22 illustrates the case where the positional relationship between one vertex pixel VA0 of the block BK1 and three vertex adjacent pixels NB0, NC0 and ND0 on the output image UG is different from the positional relationship between the corresponding positions PA0, PB0, PC0 and PD0 on the input image IG.

Further, even in a case where the blocks BK are continuous in the output image UG, the corresponding blocks TB corresponding to those blocks BK are not required to be continuous in the input image IG. For example, FIG. 22 illustrates the case where when two blocks BK1 and BK2 are continuous in the output image UG, corresponding blocks TB1 and TB2 corresponding to the blocks BK1 and BK2 are discontinuous in the input image IG.

As described above, the distortion correction processing for a continuous area in the output image UG may be performed based on the image data in a discontinuous area in the input image IG.

Note that the size of the reference area including the corresponding blocks TB is limited by the bit width capable of being stored in each address of the associative memory 302. For example, in a case where the bit width capable of being stored in each address of the associative memory 302 is 5 bits, the size of the block BK is adjusted such that the reference area becomes the area having the size of less than 32 pixels vertically (arrow YV in FIG. 22) and less than 32 pixels horizontally (arrow YH in FIG. 22).

Further, while the distortion correction processing is performed by the image processing apparatus 1A in the preferred embodiment above, the present invention is not limited thereto. FIG. 23 shows an imaging apparatus 100 according to yet still another modification.

As shown in FIG. 23, the imaging apparatus 100 includes, for example, an imaging device 101 such as a COMS sensor and a CCD sensor, and has the function of receiving light (subject light) forming a subject image to generate an image signal regarding the subject image.

The image data of the captured image obtained by the imaging device 101 is stored in the image data storage part 22 of the first processing circuit 2. Then, in the imaging apparatus 100, the image data is subjected to the above-mentioned distortion correction processing by the distortion correction part 30 of the second processing circuit 3.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus, comprising:
an acquisition part configured to acquire a corresponding position on an input image with respect to a predetermined pixel on an output image;

a first storage part configured to store position information of said corresponding position;

a reading controller configured to cause pixel values of input pixels on said input image to be sequentially read;

an organization part configured to organize a set of grid points formed of said input pixels constituting a part of said input image from said input pixels, pixel values of said input pixels having been read by said reading controller;

a judgment part configured to judge, based on said position information, whether or not said set of grid points contains said corresponding position;

a second storage part configured to store, in a case where judgment is made that said set of grid points contains said corresponding position by said judgment part, pixel values of pixels forming said set of grid points as pixel values of surrounding pixels regarding said predetermined pixel; and a calculation part configured to calculate a pixel value of said predetermined pixel by interpolation using the pixel values of said surrounding pixels stored in said second storage part.

2. The image processing apparatus according to claim 1, wherein said reading controller is configured to cause the pixel values of said input pixels to be read in a raster sequence.

3. The image processing apparatus according to claim 1, wherein:

said second storage part is configured to store the pixel values of the surrounding pixels regarding a plurality of said predetermined pixels in a raster sequence on said output image; and said calculation part is configured to sequentially calculate the pixel values of said predetermined pixels using the pixel values of said surrounding pixels input in units of said predetermined pixels based on a storage sequence in said second storage part, and sequentially output the calculated pixel values of said predetermined pixels.

4. The image processing apparatus according to claim 1, wherein said first storage part and said judgment part are implemented by an associative memory.

5. The image processing apparatus according to claim 1, wherein:

said acquisition part is configured to acquire said corresponding position regarding said predetermined pixel included in a block obtained by dividing said output image, and set a reference area including a corresponding block on said input image with respect to said block; and said reading controller is configured to cause the pixel values of said input pixels included in said reference area to be sequentially read.

6. The image processing apparatus according to claim 1, wherein:

said judgment part is configured to judge whether or not a set of grid points contains a corresponding position each time a pixel value of an input pixel on said input image is read by said reading controller.

7. The image processing apparatus according to claim 1, wherein:

a number of points in said set of grid points is smaller than a number of input pixels on said input image.

8. A method of operating an image processing apparatus, comprising the steps of:

a) acquiring a corresponding position on an input image with respect to a predetermined pixel on an output image;

b) storing position information of said corresponding position;

c) causing pixel values of input pixels on said input image to be sequentially read;

d) organizing a set of grid points formed of said input pixels constituting a part of said input image from said input pixels, pixel values of said input pixels having been read in said step c);

e) judging, based on said position information, whether or not said set of grid points contains said corresponding position;

f) storing, in a case where judgment is made that said set of grid points contains said corresponding position in said step e), pixel values of pixels forming said set of grid points as pixel values of surrounding pixels regarding said predetermined pixel; and g) calculating a pixel value of said predetermined value by interpolation using the pixel values of said surrounding pixels stored in said step f).

\* \* \* \* \*